United States Patent
Lima et al.

(10) Patent No.: US 11,434,881 B2
(45) Date of Patent: Sep. 6, 2022

(54) CAMERA SWEEPER

(71) Applicant: Lintec of America, Inc., Richardson, TX (US)

(72) Inventors: Marcio Dias Lima, Richardson, TX (US); Sergey Li, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 419 days.

(21) Appl. No.: 16/721,179

(22) Filed: Dec. 19, 2019

(65) Prior Publication Data
US 2020/0200153 A1   Jun. 25, 2020

Related U.S. Application Data

(60) Provisional application No. 62/782,209, filed on Dec. 19, 2018.

(51) Int. Cl.
*F03G 7/00* (2006.01)
*F16M 11/06* (2006.01)
*G03B 17/56* (2021.01)

(52) U.S. Cl.
CPC ............ *F03G 7/00* (2013.01); *F16M 11/06* (2013.01); *G03B 17/561* (2013.01)

(58) Field of Classification Search
CPC ......... G03B 17/561; F03G 7/00; F16M 11/08; F16M 13/02; F16M 11/04; F16M 11/10; F16M 11/06; H02K 7/1869; H02K 7/1876; H02K 7/1892; H02K 41/02; H02K 49/102; H02K 49/106; H02K 49/108; G08B 13/19617; G08B 13/1963
See application file for complete search history.

(56) References Cited

U.S. PATENT DOCUMENTS

| | | | | |
|---|---|---|---|---|
| 4,458,227 A | * | 7/1984 | Petersen | H01F 7/1646 396/464 |
| 4,860,040 A | * | 8/1989 | Tamamura | G03B 3/00 396/97 |
| 8,089,694 B2 | * | 1/2012 | Wernersson | H04N 5/232 359/554 |
| 10,499,037 B1 | * | 12/2019 | Wilcox | H04N 5/2257 |
| 11,131,907 B2 | * | 9/2021 | Lima | G03B 17/561 |

FOREIGN PATENT DOCUMENTS

| | | | | |
|---|---|---|---|---|
| CN | 111561633 B | * | 8/2020 | F16M 11/046 |
| KR | 101703632 B1 | * | 2/2017 | H02K 41/02 |

* cited by examiner

*Primary Examiner* — Christopher E Mahoney
(74) *Attorney, Agent, or Firm* — Greenblum & Bernstein, P.L.C.

(57) ABSTRACT

An apparatus and method of manufacturing an apparatus that includes a rectangular frame, a first load bearing conductive support bisecting the rectangular frame lengthwise, and two artificial muscle actuators disposed on the same sides of the rectangular frame as the first load bearing conductive support on opposite sides of the first load bearing conductive support is disclosed. The apparatus includes a non-conductive platform, where the width of the frame is sufficiently wide to prevent the non-conductive platform from touching the sides of the frame when rotated about the axis of the load bearing support. The apparatus includes a device disposed in the center of the non-conductive platform. Individual actuation of the artificial muscle actuators rotates the non-conductive platform about the axis of the first load bearing conductive support.

20 Claims, 3 Drawing Sheets

CAMERA SWEEPER

CROSS-REFERENCE TO RELATED APPLICATIONS

This Application claims priority, pursuant to 35 U.S.C. § 119(e) to U.S. Provisional Application 62/782,209 filed on Dec. 19, 2018. The contents of which are hereby incorporated by reference in its entirety.

BACKGROUND OF INVENTION

Artificial actuator devices based on elastic polymeric fibers have a wide range of applications. Devices comprising twisted and/or coiled actuators have the advantage of low cost, high production volume, and design simplicity. Artificial actuator devices may have advantages over small motors because of the greatly simplified engineering and lower product costs. Motors that provide rotational device movement may be expensive, bulky, and noisy, particularly if they are manufactured for harsh environments, for example in a vehicle. Artificial actuator devices may provide for a smaller, cheaper, and quieter alternative to conventional motors.

SUMMARY OF INVENTION

In one aspect, embodiments disclosed herein are directed to an apparatus that includes a rectangular frame, a first load bearing conductive support bisecting the rectangular frame lengthwise, and two artificial muscle actuators disposed on the same sides of the rectangular frame as the first load bearing conductive support on opposite sides of the first load bearing conductive support. The apparatus includes a non-conductive platform, where the width of the frame is sufficiently wide to prevent the non-conductive platform from touching the sides of the frame when rotated about the axis of the load bearing support. The apparatus includes a device disposed in the center of the non-conductive platform. In accordance with embodiments disclosed herein, actuation of the artificial muscle actuators rotates the non-conductive platform about the axis of the first load bearing conductive support.

In another aspect, embodiments disclosed herein relate to a method of manufacturing an apparatus that includes obtaining a rectangular frame, threading a first load bearing conductive support through holes in the frame bisecting the rectangle lengthwise, and threading two artificial muscle actuators through holes in the frame on each side of the first load bearing conductive support. The method includes disposing a non-conductive platform on the first load bearing conductive support and the two artificial muscle actuators, where the width of the frame is sufficiently wide to prevent the non-conductive platform from touching the sides of the frame when rotated about the axis of the load bearing support, and disposing a device in the center of the non-conductive platform. The method also includes securing the first load bearing conductive support and the two artificial muscle actuators to the frame.

DETAILED DESCRIPTION

Figure 1:
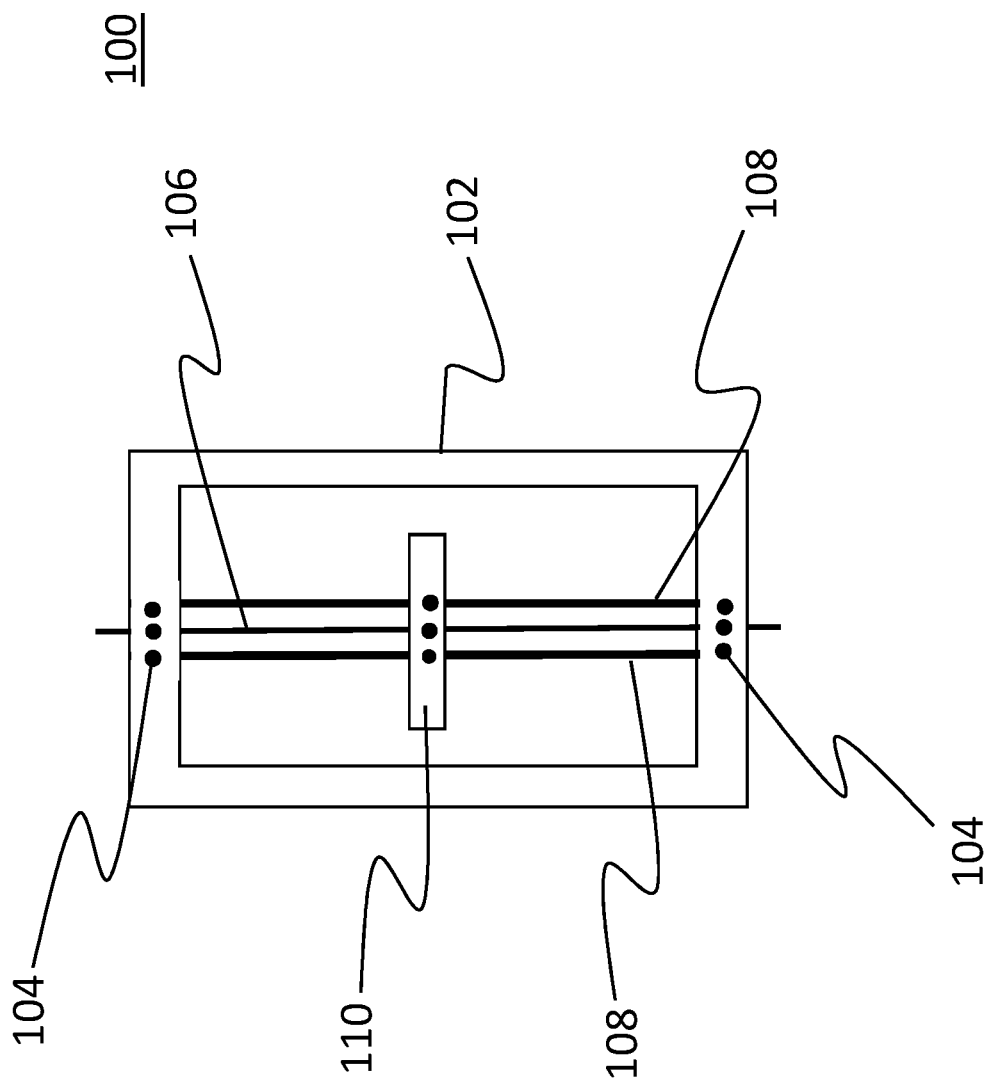
FIG. 1 is a schematic in accordance with one or more embodiments disclosed herein.

In the following detailed description of embodiments of the invention, details are set forth in order to provide a more thorough understanding of the invention. However, it will be apparent to one of ordinary skill in the art that the invention may be practiced without some of the details. In other instances, well-known features have not been described in detail to avoid unnecessarily complicating the description.

Terms like "approximately," "substantially," etc., mean that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect of the characteristic was intended to provide.

In general, embodiments of the invention relate to an apparatus and method of manufacturing an apparatus to provide a sweeping motion for a device using a frame structure. For example, embodiments disclosed herein may provide for an apparatus for providing a sweeping motion for a device such as camera, sensor, or the like. Embodiments disclosed herein may provide for simple, quiet, low cost, and robust alternative to conventional motors.

Embodiments disclosed herein use polymer and/or Carbon Nanotube artificial muscle actuators that includes twist-spun nanofiber yarns and twisted polymer fibers that generate torsional and/or tensile actuation when powered electrically, photonically, thermally, chemically, by absorption, or by other means. Embodiments of the invention include actuators that use coiled yarns or polymer fibers and may be either neat or include a guest.

Embodiments include an apparatus that has a rectangular frame, with a load bearing conductive support (e.g., metal wire, rod, or shaped piece) bisecting the rectangle. Embodiments include at least two artificial muscle actuators arranged on each side of the load bearing conductive support. The artificial muscle actuators may be arranged to be parallel to the load bearing conductive support, in accordance with some embodiments. A non-conductive platform for mounting the device, such as a camera, is disposed on the load bearing conductive support and the two artificial muscle actuators. The size of the frame and platform are selected such that the width of the frame is sufficiently wide to prevent the non-conductive platform from touching the sides of the frame when rotated about the axis of the load bearing support.

In accordance with embodiments disclosed herein, the actuation of the artificial muscle actuators causes the non-conductive platform to rotate about the axis of the load bearing conductive support.

In embodiments disclosed herein, the artificial muscle actuators may be torsional or linear artificial muscle actuators. In the embodiments using linear artificial muscle actuators, the linear artificial muscle actuators may be arranged in a coil about a metal wire to provide the desired tilting or sweeping motion of the platform and device.

FIG. 1 shows a schematic of an apparatus in accordance with one or more embodiments disclosed herein. The apparatus 100 includes a rectangular frame 102. One of ordinary skill in the art will appreciate that the frame is not limited to a rectangular shape. The frame may be non-conductive to avoid the potential for electrical shorts in the system. In accordance with embodiments disclosed herein, the frame should be manufactured from a material that will not deform in the presence of prolonged heat and humidity. For example, the frame could be made of Nylon, ceramic, or a thick plastic. In some embodiments, the frame may be made out of a conductive material (such as metal). In such embodiments, the conductive frame may be insulated or adapted so as not to create unwanted shorts in the system. The width of the frame should be wide enough so that a platform at the center of the frame does not touch the sides of the frame during its 90 to −90 degree rotation.

On two of the sides of the frame there are holes to accommodate a load bearing rod and the artificial muscle fiber actuators. In the embodiments described by FIG. 1, there are three holes 104 on each of the shortest side of the rectangular frame 102. The holes 104 may be used to secure the load bearing rod 106 and artificial muscle actuators 108 to the frame 102 via pathways through which the load bearing rod 106 and artificial muscle actuators 108 may be threaded. For example, set screws maybe used to secure and set the tension the load bearing rod 106 and artificial muscle actuators 108. Alternatively, the ends of the load bearing rod 106 and artificial muscle actuators 108 may be crimped at the ends to secure the load bearing rod 106 and artificial muscle actuators 108 in the holes 104 of the frame 102. Alternatively, pegs may be incorporated into the frame using the holes to secure the load bearing rod 106 and artificial muscle actuators 108. The separation of the artificial muscle actuators 108 allows for the artificial muscle actuators 108 to cool faster than if they were in direct contact.

The apparatus 100 includes a platform 110 located at approximately the center of the frame 102 in accordance with one or more embodiments disclosed herein. The platform 102 includes pathways through the platform for the load bearing rod 106 and artificial muscle actuators 108. The platform 110 may also include holes to connect the load bearing rod 106 and artificial muscle actuators 108 to the platform using setscrews. In accordance with embodiments disclosed herein, the platform is non-conductive to prevent short circuits. The platform 110 is designed to hold the device while the platform oscillates due to actuation of the artificial muscle actuators 108.

In accordance with one or more embodiments disclosed herein, the closer the weight of the device is to the center of the platform, the more uniform the speed and degree of rotation. For example, if the device is off center on the platform 110, the platform 110 may fall faster in the direction of most of the weight, and the device may take more time to lift that weight to rotate in the opposite direction.

In accordance with one or more embodiments disclosed herein, the artificial muscle actuators 108 may be torsional muscles. Alternatively, the artificial muscles actuators may be linear artificial muscle actuators coiled around a supporting wire, as explained below. The artificial muscle actuators 108 contract upon actuation; thus, the actuation of one of the artificial muscle actuators 108 causes the platform to tilt in one direction, while actuation of the other artificial muscle actuators 108 causes the platform to tilt in the other direction. The two artificial muscle actuators 108 are installed at the same tension in accordance with embodiments disclosed herein.

In embodiments disclosed herein, the load bearing rod 106 may be a metal wire with an optimal stiffness to twist with the artificial muscle actuators 108 without excessive resistance and bear the weight of the device. Embodiments of the load bearing rod 106 are conductive, with a low thermal expansion, and corrosion resistant. For example, the load bearing rod 106 may be made of suitable metals such as Stainless Steel and/or Tungsten. In accordance with some embodiments disclosed herein, the gauge of the load bearing rod 106 is less than 10 Mil. In some embodiments, the gauge of the load bearing rod 106 is 8 Mil. The load bearing rod 106 bears the weight of the device on the platform 110 and defines the axis of rotation of the platform 110. Because the artificial muscle actuators 108 do not bear the full weight of the platform, the artificial muscle actuators 108 are less susceptible to creep and may last for more cycles when compared to the absence of the load bearing rod 106.

As a working example of the embodiments disclosed herein, the size of the frame 102 may be on the order of 6 cm long by 3.5 cm wide and 6.4 mm thick. The load bearing rod may be a metal wire, with each of the artificial muscle actuators 108 being placed 2.5 mm away from the metal wire. The artificial muscle actuators 108 are made of Nylon 6,6 that is 500 um in diameter, with a bias angle greater than 50 degrees. The device 100 has a maximum frequency of up to 5 Hz. More specifically, a 10 g weight (device) on the platform 110 may be tilted from 45 degrees to −45 degrees at a rate of 3.5 Hz. Such embodiments may utilize a 100 mA and 12 V voltage with a 5% duty cycle to rotate the platform 110. In accordance with embodiments disclosed herein, a resonance mode may be achieved by pulsing the voltage of the system. In general, the shorter the pulse, the more efficient the system.

Figure 2:
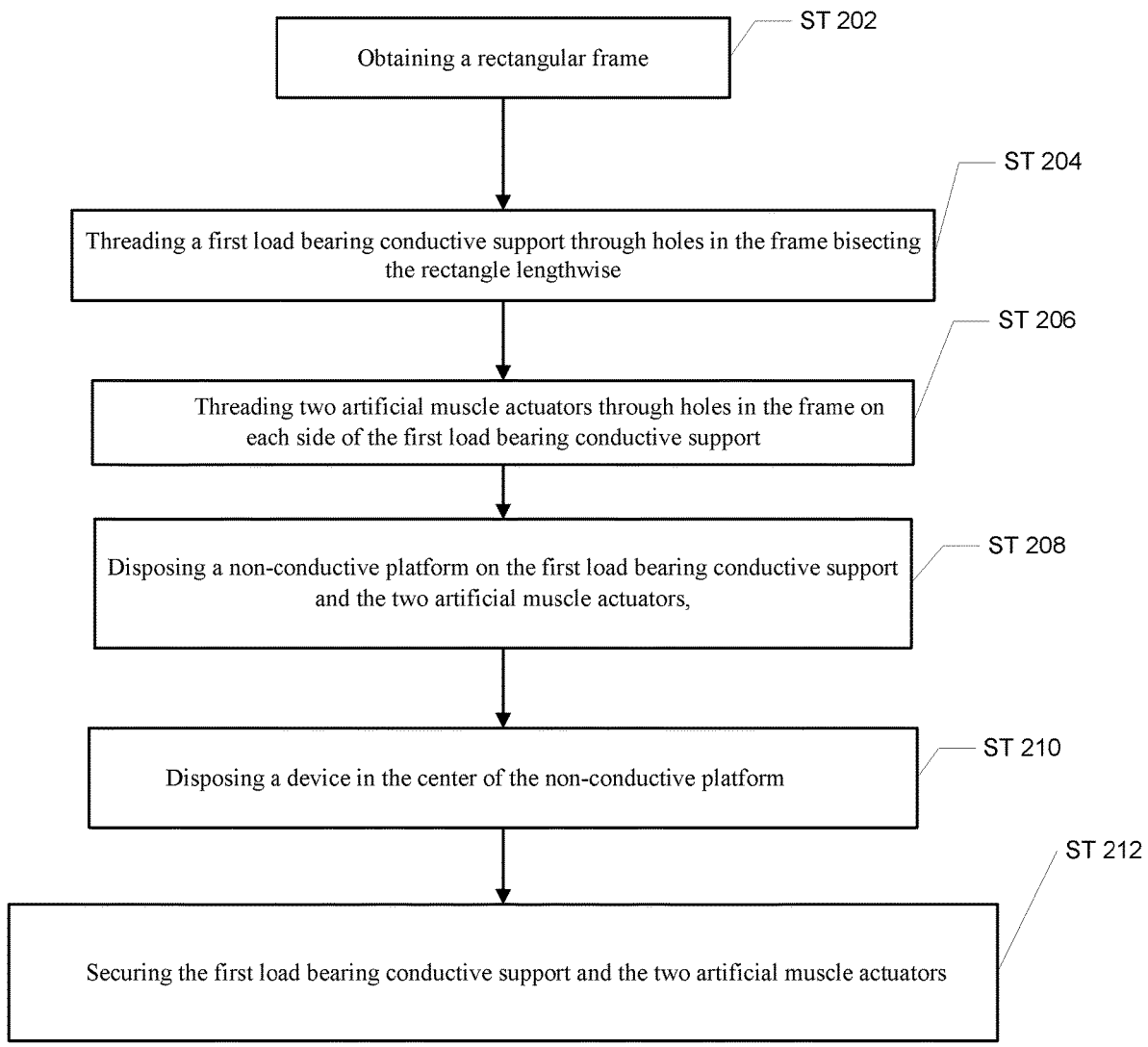
FIG. 2 describes a method of manufacturing an apparatus in accordance with one or more embodiments disclosed herein.

FIG. 2 describes a method of manufacturing a sweeper apparatus in accordance with one or more embodiments disclosed herein. The method of manufacturing an apparatus in accordance with embodiments herein includes obtaining a rectangular frame in ST 202. As previously stated, the frame is made of a non-conductive material. In ST 204, a first load bearing conductive support is threaded through holes in the frame bisecting the rectangle lengthwise. In ST 206, two artificial muscle actuators are threaded through holes in the frame on each side of the first load bearing conductive support.

In ST 208, a non-conductive platform is disposed on the first load bearing conductive support and the two artificial muscle actuators. For example, the non-conductive platform may include holes to which the first load bearing conductive support and artificial muscle fibers may be threaded to dispose the non-conductive platform. The non-conductive platform may also include channels which the first load bearing conductive support and artificial muscle fibers are set to secure the platform. The non-conducting platform may also be mounted onto the first load bearing conductive support and artificial muscle fibers using clamps or an adhesive. In accordance with embodiments disclosed herein, the width of the frame is sufficiently wide to prevent the non-conductive platform from touching the sides of the frame when rotated about the axis of the load bearing support.

In ST 210, a device is disposed in the center of the non-conductive platform. As the platform tilts, the weight of the device also shifts; therefore, it is preferable that the device be disposed in the center of the platform to facilitate controlled, uniform tilting of the platform. As previously noted, the device may include, but is not limited to, a camera, sensor, or light source. The device may be disposed on the platform in a variety of ways. For example, the platform may be shaped to accommodate and fix the specific device to the platform. One of ordinary skill in the art will appreciate that the device may also be disposed onto the platform using an adhesive, screws, nails, etc.

In ST 212, the first load bearing conductive support and the two artificial muscle actuators are secured to the frame. One of ordinary skill will appreciate that the steps of the method disclosed herein are not limited to any particular order. For example, ST 212 may be performed prior to ST 210, or ST 212 may be performed prior to step 208. One of ordinary skill in the art will also appreciate that ST 212 is directed to fixing the first load bearing conductive support and artificial muscle fibers to the frame and may be accomplished using a variety of methods. In the previous embodiments, a hole is provided in the frame to thread the first load bearing conductive support and artificial muscle fibers to secure these components to the frame; however, embodiments disclosed herein are not limited to such. For example, pegs may be incorporated into the frame in order to fix the first load bearing conductive support and artificial muscle fibers to the frame. In embodiments disclosed herein, it is preferable that the two artificial muscle actuators have the same tension, to ensure uniform controlled motion.

In embodiments disclosed herein, one or more sensors may be included to measure the speed or angular displacement of the platform. For example, a hall effect sensor may be used. In such embodiments, a magnet may be disposed on one of the artificial muscle actuators and a circuit is disposed on the frame adjacent to the magnet. When actuation occurs, movement of the magnet is detected in the circuit.

As another example, two conductive wires may be used in place of the first load bearing conductive support (provided the two conductive wires can accommodate the platform). In these embodiments, the relative capacitance between the two conducting wires may be used to determine the angular displacement of the platform. Examples of the conductive wires include, but are not limited to, metal, single-ply yarns, or double-ply yarns.

In one or more embodiments, the sensors may be incorporated into a feedback mechanism in order to control the actuation of the artificial muscle fibers and, hence the sweeping motion of the platform.

Figure 3:
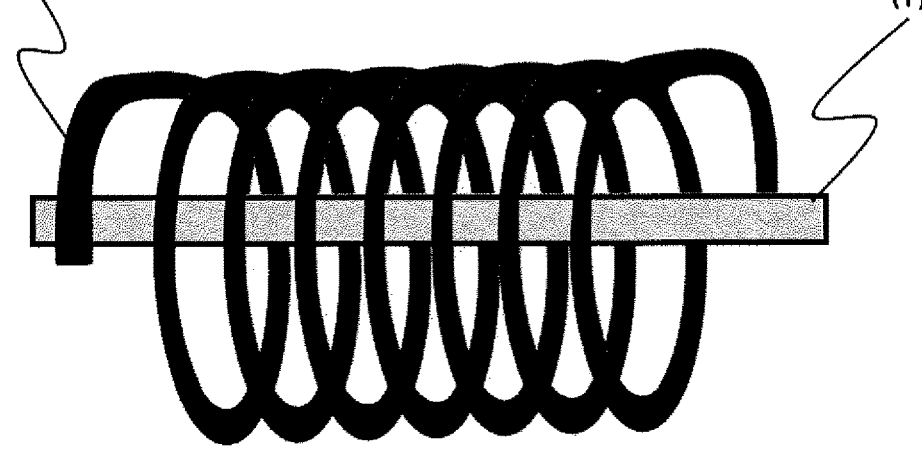
FIG. 3 is a schematic in accordance with one or more embodiments disclosed herein.

In some embodiments, linear artificial muscle actuators with a metal wire running through the center of the coil may be used. FIG. 3 shows a schematic in accordance with such embodiments. The artificial muscle actuator 300 demonstrated by FIG. 3 includes a linear artificial muscle actuator 316 coiled around a conducting wire 318. The ends of the wire 318 being secured to prevent linear actuation of the artificial muscle actuator 300. The linear artificial muscle actuator 316 is coiled around the conducting wire 318 and the ends of the linear artificial muscle actuator 316 are secured to the wire 318. The ends of the linear artificial muscle actuator 316 may be secured to the wire 318 by crimping or other methods. The methods of attaching the linear artificial muscle actuator 316 to the wire 318 is not limited, provided the electrical connections are maintained.

Although the disclosure has been described with respect to only a limited number of embodiments, those skilled in the art, having benefit of this disclosure, will appreciate that various other embodiments may be devised without departing from the scope of the present invention.

What is claimed is:

1. An apparatus comprising:
   a rectangular frame;
   a first load bearing conductive support bisecting the rectangular frame lengthwise;
   two artificial muscle actuators disposed on two sides of the rectangular frame as the first load bearing conductive support and on opposite sides of the first load bearing conductive support;
   a non-conductive platform, wherein
      the width of the frame is sufficiently wide to prevent the non-conductive platform from touching the sides of the frame when rotated about the axis of the load bearing support;
   a device disposed in the center of the non-conductive platform;
   wherein an actuation of the artificial muscle actuators rotates the non-conductive platform about the axis of the first load bearing conductive support.

2. The apparatus of claim 1, wherein the first load bearing conductive support and the artificial muscle actuators are attached to one side of the rectangular frame using set screws.

3. The apparatus of claim 1, wherein the non-conductive platform is attached to the first load bearing conductive support and the artificial muscle actuators using set screws.

4. The apparatus of claim 1, wherein the first load bearing conductive support and artificial muscle actuators are secured to pegs incorporated into the frame.

5. The apparatus of claim 1, wherein the frame is 6 cm long by 3.5 cm wide and 6.4 mm thick.

6. The apparatus of claim 1, wherein the artificial muscle actuators are torsional artificial muscle actuators.

7. The apparatus of claim 6, wherein the artificial muscle actuators comprise Nylon 6,6 and are 500 um in diameter, with a bias angle greater than 50 degrees.

8. The apparatus of claim 1, wherein the first load bearing conductive support is a metallic wire.

9. The apparatus of claim 1, wherein the artificial muscle actuators are actuated using a frequency of 5 Hz at 100 mA and 12 V with a 5% duty cycle, resulting in a 10 g device being tilted from 45 degrees to −45 degrees at a rate of 3.5 Hz.

10. The apparatus of claim 1, further comprising: one or more sensors to measure speed or angular displacement of the platform to supply feedback for actuating the artificial muscle actuators.

11. The apparatus of claim 10, wherein one of the sensors is a hall effect sensor.

12. The apparatus of claim 1, further comprising: a second load bearing conductive wire disposed at a known distance from the first load bearing conductive wire in the frame, wherein the relative capacitance between the second load bearing conducting wire and the first load bearing conductive wire is used to determine the angular displacement of the non-conductive platform.

13. The apparatus of claim 1, wherein the artificial muscle actuators are coiled linear artificial muscle actuators with a metal wire running through the center of the coil.

14. A method of manufacturing an apparatus comprising:
   obtaining a rectangular frame;
   threading a first load bearing conductive support through holes in the frame bisecting the rectangle lengthwise;
   threading two artificial muscle actuators through holes in the frame on each side of the first load bearing conductive support;
   disposing a non-conductive platform on the first load bearing conductive support and the two artificial muscle actuators,
   wherein the width of the frame is sufficiently wide to prevent the non-conductive platform from touching the sides of the frame when rotated about the axis of the load bearing support;
   disposing a device in the center of the non-conductive platform;

securing the first load bearing conductive support and the two artificial muscle actuators to the frame, wherein an actuation of the artificial muscle actuators rotates the non-conductive platform about the axis of the first load bearing conductive support.

15. The method of claim 14, wherein the first load bearing conductive support and the two artificial muscle actuators are secured using set screws.

16. The method of claim 14, wherein the non-conductive platform is disposed on the first load bearing conductive support and the artificial muscle actuators using set screws.

17. The method of claim 14, wherein the artificial muscle actuators are torsional artificial muscle actuators.

18. The method of claim 14, further comprising: disposing one or more sensors on the frame to measure speed or angular displacement of the platform to supply feedback for actuating the artificial muscle actuators.

19. The method of claim 18, wherein one of the sensors is a hall effect sensor.

20. The method of claim 14, further comprising: threading a second load bearing conductive wire through holes in the frame parallel to and at a known distance from the first load bearing conductive wire in the frame, wherein a relative capacitance between the second load bearing conducting wire and the first load bearing conductive wire is used to determine the angular displacement of the non-conductive platform.

* * * * *